United States Patent
Schwiderski et al.

(10) Patent No.: US 7,509,877 B2
(45) Date of Patent: Mar. 31, 2009

(54) ELECTRODE WITH ELECTRODE SURFACE FOR MAGNETICALLY INDUCTIVE FLOW METER

(75) Inventors: Hans-Werner Schwiderski, Noerten-Hardenberg (DE); Dieter Keese, Wahlsburg (DE)

(73) Assignee: ABB Patent GmbH, Ladenburg (DE)

( * ) Notice: Subject to any disclaimer, the term of this patent is extended or adjusted under 35 U.S.C. 154(b) by 17 days.

(21) Appl. No.: 11/643,486

(22) Filed: Dec. 21, 2006

(65) Prior Publication Data

US 2007/0220991 A1    Sep. 27, 2007

(30) Foreign Application Priority Data

Dec. 23, 2005   (DE)   ................ 10 2005 062 103
Feb. 17, 2006   (DE)   ................ 10 2006 007 393

(51) Int. Cl.
    *G01F 1/58*    (2006.01)
(52) U.S. Cl. .................................... 73/861.12
(58) Field of Classification Search ................. 73/25.03, 73/304 R; 340/450.3; 204/426
    See application file for complete search history.

(56) References Cited

U.S. PATENT DOCUMENTS

| 4,188,826 | A | * | 2/1980 | Kankura et al. | ............ | 73/304 R |
| 4,958,514 | A | * | 9/1990 | Takami et al. | ............... | 73/25.03 |
| 5,907,278 | A | * | 5/1999 | Park et al. | ................ | 340/450.3 |
| 7,156,966 | B2 | * | 1/2007 | Nakagaki et al. | ............ | 204/426 |

* cited by examiner

*Primary Examiner*—Jewel Thompson
(74) *Attorney, Agent, or Firm*—Paul R. Katterle; Michael M. Rickin; Michael C. Prewitt

(57) ABSTRACT

The invention relates to a special electrode surface for electrodes of a flow measuring device. In order to provide more measurement reliability for abrasive substances to be measured, for example in multiphase substances to be measured, according to the invention the size of the active electrode surface (3) is optimized independently of the size of the electrode (2) to be sealed in by means of a coating (4) so that an electrically nonconductive coating leaves free only the electrically active surface (3).

3 Claims, 1 Drawing Sheet

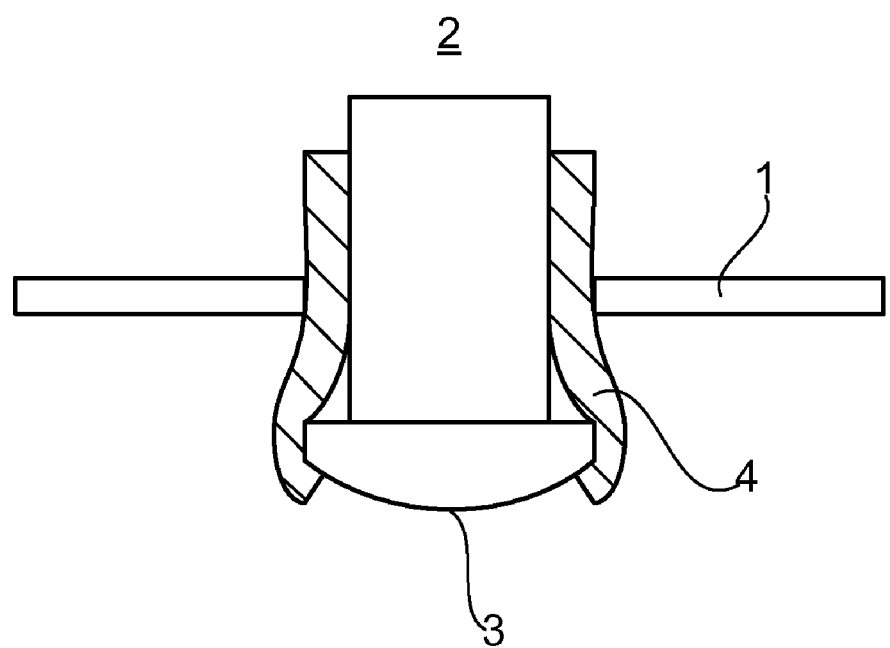

ELECTRODE WITH ELECTRODE SURFACE FOR MAGNETICALLY INDUCTIVE FLOW METER

CROSS REFERENCE TO RELATED APPLICATIONS

This application claims priority from German Application Nos. DE 10 2005 062 103.1 filed on Dec. 23, 2005 and DE 10 2006 007 393.2 filed on Feb. 10, 2006 the contents of which are relied upon and incorporated herein by reference in their entirety, and the benefit of priority under 35 U.S.C. 119 is hereby claimed.

BACKGROUND OF THE INVENTION

The invention relates to a special electrode surface for electrodes of magnetically inductive flow meters.

The theoretical calculation of the size of electrode surfaces in IFMs is based on point-like electrodes which, however, are never achievable in practice. The electrodes used are normally ones whose diameter is several mm or cm in diameter depending on the rated width, in order to be able to seal them into a clad measurement tube. According to experience, the contact resistance between the electrode and the medium is not equal everywhere, rather the position of least junction resistance migrates statistically around on the electrode surface.

A displacement along the diagonal reduces the measurement sensitivity, which is thus subject to statistical fluctuations. A shift in the axial direction means the displacement of a piece of a conductor loop in the magnetic field. A voltage is therefore induced, which is superimposed on the measurement voltage.

It is an object of the invention to avoid these disadvantages.

SUMMARY OF THE INVENTION

In accordance with the present invention, an electrode is provided, wherein the size of the active electrode surface is optimized independent of the size of the electrode by using a nonconductive coating that leaves free only the electrically active surface.

BRIEF DESCRIPTION OF THE DRAWING

The FIGURE shows a schematic view of an electrode embodied in accordance with the present invention.

DETAILED DESCRIPTION OF ILLUSTRATIVE EMBODIMENTS

The concept of the invention is now to optimize the size of the active electrode surface 3 independently of the size of the electrode to be sealed in by means of a coating 4, so that an electrically nonconductive coating 4 leaves free only the electrically active surface 3, as can be seen from the drawing. Here, the coating 4 is represented very clearly. On the active electrode area 3, naturally, it is designed to be flattened so that it does not perturb the flow.

The aperture for passing the electrode through the wall of the measurement tube 1 is then dimensioned accordingly.

It is thus proposed that the remaining surface of the electrode should be coated with an electrically nonconductive layer comprising inorganic or organic plastics (ceramic, nitrates etc.).

At the same time, it is thereby possible to geometrically optimize the electrically active face, which is not coated, so that it is possible to reduce or increase this "small" area depending on the application.

An increase is recommendable for example in the case of a substance to be measured which comprises insulating constituents, for example with a high fat component, while a reduction is advantageous for the measurement reliability in the case of abrasive substances to be measured, for example multiphase substances to be measured.

The invention claimed is:

1. An electrode for use in flow measuring devices to measure flow of one of two or more types of conductive liquids comprising:

an active electrode surface for contacting with said conductive liquid flow; and an electrically nonconductive coating for sealing the surface of said electrode except for said electrode surface for contacting said conductive liquid flow;

said active electrode surface having an area for contacting said liquid dependent on which one of said two or more types of conductive liquids is to be measured by said electrode.

2. A method for making an electrode for use in flow measuring devices to measure flow of one of two or more types of conductive liquids, said electrode having an active electrode surface for contacting with said conductive liquid flow comprising:

selecting an area for said active electrode surface for contacting said liquid dependent on which one of said two or more types of conductive liquids is to be measured by said electrode; and coating all of said electrode with a nonconductive coating except for said selected area of said active electrode surface.

3. A device to measure flow of one of two or more types of conductive liquids comprising:

a measuring tube having a wall with an opening through which an electrode for measuring flow of one or two or more types of conductive liquids flowing in said tube;

said electrode comprising:

an active electrode surface for contacting with said conductive liquid flow; and an electrically nonconductive coating for sealing the surface of said electrode except for said electrode surface for contacting said conductive liquid flow;

said active electrode surface having an area for contacting said liquid dependent on which one of said two or more types of conductive liquids is to be measured by said electrode.

* * * * *